UNITED STATES PATENT OFFICE.

PETER T. AUSTEN, OF NEW BRUNSWICK, NEW JERSEY, ASSIGNOR TO WILLIAM J. MATHESON & CO., LIMITED, OF NEW YORK, N. Y.

COLORING-MATTER FROM LOGWOOD AND MODE OF PREPARING SAME.

SPECIFICATION forming part of Letters Patent No. 491,972, dated February 14, 1893.

Application filed October 8, 1892. Serial No. 448,172. (No specimens.)

*To all whom it may concern:*

Be it known that I, PETER T. AUSTEN, a citizen of the United States, and a resident of New Brunswick, in the county of Middlesex and State of New Jersey, have discovered certain new and useful Improvements in the Art of Making Coloring-Matter from Logwood, of which the following is a specification.

Heretofore the coloring matter extracted from logwood has been made and used in the arts either in the form of a paste, a liquid, or of the consistency of thick pitch. All of these forms are open to many practical objections. When in a liquid form, the coloring matter undergoes a change at low atmospheric temperatures, losing much of its tinctorial power if chilled or frozen; it is practically insoluble in cold water; it does not generally give a bloomy color when dissolved in pure water; it is sticky and disagreeable to handle; more or less always remains in the barrels to waste; it is troublesome to weigh out with the required accuracy; it is liable to leakage from the barrels, and evaporation from the open barrel in the dye room, thereby altering the standard of tinctorial power and causing embarrassment; it often contains resinous and extractive matters liable to injure the purity of the dye and prevent it from giving the color of cured chip wood, and which also deposit and accumulate on the nips and rolls through which the cloth to be dyed is passed and hence frequently causes injury to the goods, as well as annoyance and loss to the manufacturer. Again, it contains more or less latent coloring matter which is lost in certain processes of dyeing; furthermore its large content of water greatly increases the cost of transportation, storage and handling. When of the consistency of pitch, in which form it is known to the trade as solid extract of logwood, besides having most of the objections to the liquid extract, it is practically insoluble in cold water, and dissolves slowly even in boiling water. It has frequently less bloom than the liquid extracts, or decoctions, and if dried sufficiently to be capable of being powdered at a low atmospheric temperature, it will melt, or run together, at higher atmospheric temperatures, unless burned or incinerated, in which case the tinctorial power is greatly impaired, if not destroyed.

My invention meets and overcomes all these objections, giving a stronger and purer color.

It consists of a process for making a solid coloring matter from logwood which is not affected by the extremes of atmospheric temperature, and which can be made and will continue and can be used in the form of a dry powder similar to a coal tar dye, and which has the same advantages of stability, rapid solubility in water, which are possessed by many coal tar dyes, and which allow of the same facility and accuracy in determining the proper proportions required. Being much freer from tannin and resinous matters it affords a practical substitute for chip logwood, and avoids the labor, time and expense required in the use of logwood in the form of chips.

To carry out my invention I heat ordinary liquid extract of logwood and mix with it sodium or potassium nitrites in the proportion of about five pounds of solid nitrite to each one hundred pounds of liquid extract of 51° Twaddle. The mixture is then stirred and evaporated to a point at which it becomes solid and brittle on cooling.

The method I have employed with most satisfaction is the following: I heat ordinary liquid extract of logwood of 51° Twaddle to about 140° of Fahrenheit, and add to it in successive portions an aqueous solution of potassium, or sodium nitrite, in the proportion given above, thoroughly mixing them and maintaining the temperature. A copious evolution of gas takes place, which is facilitated by stirring, or agitation. The heating is continued with frequent or continuous stirring until the evolution of gas has ceased, and the mixture is sufficiently evaporated to form a solid mass on cooling, which is sufficiently brittle to be ground into a powder, if so desired. A coloring matter is thus obtained in the form of a powder which appears black in shadow and purplish black in strong sunlight and is practically soluble in cold water and rapidly soluble in hot water, having the characteristics heretofore described. It may be dyed on wool by the same method as logwood, by mordanting the material in the usual manner with potassium bichromate and potassium bitartrate, but adding to the dyebath about twenty five percent of the weight of the coloring matter of acetic acid. The color thus produced is much stronger and deeper than that produced by dyeing with equal quantities of logwood extract of 51° Twaddle.

The above method of procedure is the best to me at present known. But, as heat and time are frequently convertible conditions in chemical reactions, I do not limit myself to the temperature, nor to the exact proportions above set forth; the essence of my discovery and invention being, that when logwood extracts are treated with nitrite of soda or potash under such conditions as to bring about a reaction between them, a new product may be produced having the characteristics hereinbefore set forth.

Having thus described my invention, what I claim as new, and desire to patent, is—

1. In the art of making logwood extract, the improvement which consists in adding to logwood extract an alkaline nitrite in the presence of water and causing a reaction between the nitrite and the extract, substantially as described.

2. In the art of making logwood extract, the improvement which consists in adding to logwood extract an alkaline nitrite in the presence of water, causing a reaction between the nitrite and the extract and evaporating the product to dryness, substantially as described.

3. As a new article of manufacture, a coloring matter derived from logwood extract by the incorporation therewith of an alkaline nitrite, and characterized by the fact of its being a friable solid, soluble in cold and rapidly soluble in hot water, substantially as described.

Signed at New York, in the county of New York and State of New York, this 6th day of October, A. D. 1892.

PETER T. AUSTEN.

Witnesses:
HENRY P. WELLS,
EMILY SCHLEGEL.